US009802148B2

(12) United States Patent
Meirav et al.

(10) Patent No.: US 9,802,148 B2
(45) Date of Patent: Oct. 31, 2017

(54) REGENERABLE SORBENT $CO_2$ SCRUBBER FOR SUBMARINE VESSELS

(71) Applicant: ENVERID SYSTEMS, INC., Houston, TX (US)

(72) Inventors: Udi Meirav, Newton, MA (US); Israel Biran, Avihayil (IL); Tzvi Fisher, Kfar Saba (IL)

(73) Assignee: ENVERID SYSTEMS, INC., Needham, MA (US)

( * ) Notice: Subject to any disclaimer, the term of this patent is extended or adjusted under 35 U.S.C. 154(b) by 0 days.

(21) Appl. No.: 14/786,941

(22) PCT Filed: Apr. 23, 2014

(86) PCT No.: PCT/US2014/035114
§ 371 (c)(1),
(2) Date: Oct. 23, 2015

(87) PCT Pub. No.: WO2014/176319
PCT Pub. Date: Oct. 30, 2014

(65) Prior Publication Data
US 2016/0082383 A1 Mar. 24, 2016

Related U.S. Application Data

(60) Provisional application No. 61/814,839, filed on Apr. 23, 2013.

(51) Int. Cl.
*B01D 53/02* (2006.01)
*B01D 53/04* (2006.01)
(Continued)

(52) U.S. Cl.
CPC ......... *B01D 53/0415* (2013.01); *B01D 53/04* (2013.01); *B01D 53/0438* (2013.01);
(Continued)

(58) Field of Classification Search
CPC ............ B01D 2251/30; B01D 2251/60; B01D 2252/204; B01D 2253/102;
(Continued)

(56) References Cited

U.S. PATENT DOCUMENTS 3,042,497 A * 7/1962 Johnson ................. B01D 53/62
422/120
3,107,641 A 10/1963 Haynes
(Continued)

FOREIGN PATENT DOCUMENTS

DE 102006048716 B3 2/2008
EP 2465596 A1 6/2012
(Continued)

OTHER PUBLICATIONS

Nuckols, M. L. et al. Technical Manual: Design Guidelines for Carbon Dioxide Scrubbers, Naval Coastal Systems Center, Oct. 16, 1985 (retrieved Aug. 11, 2014 from Internet), pp. 2, 4, 16, 30, 31, 48, 53 and 54.
(Continued)

*Primary Examiner* — Christopher P Jones
(74) *Attorney, Agent, or Firm* — Cooley LLP

(57) ABSTRACT

Systems, devices and methods for submarine $CO_2$ scrubbing are disclosed. The system may comprise an assembly including a sorbent, a scrubbing inlet configured to receive a first airflow during an adsorption mode. The first airflow may comprise air received from a cabin of a submarine. The assembly may be configured to flow the first airflow over and/or through the sorbent during the adsorption mode such that the sorbent removes a portion of $CO_2$ entrained in the first airflow. The system may also include a scrubbing outlet configured to expel the scrubbed first airflow from the assembly into the cabin. The system may include an outside air inlet configured to receive a second airflow comprising
(Continued)

outside air during a regeneration mode. The system may include a regeneration air outlet in configured to expel the second airflow after the second airflow has flowed over and/or through the sorbent during the regeneration mode.

21 Claims, 8 Drawing Sheets

(51) Int. Cl.
      *B63G 8/36*       (2006.01)
      *B01D 53/62*       (2006.01)
      *B01D 53/82*       (2006.01)
      *B01D 53/86*       (2006.01)

(52) U.S. Cl.
    CPC ............. *B01D 53/62* (2013.01); *B01D 53/82* (2013.01); *B63G 8/36* (2013.01); *B01D 53/8668* (2013.01); *B01D 2251/30* (2013.01); *B01D 2251/80* (2013.01); *B01D 2252/204* (2013.01); *B01D 2253/102* (2013.01); *B01D 2253/104* (2013.01); *B01D 2253/106* (2013.01); *B01D 2253/108* (2013.01); *B01D 2253/11* (2013.01); *B01D 2253/204* (2013.01); *B01D 2257/106* (2013.01); *B01D 2257/402* (2013.01); *B01D 2257/504* (2013.01); *B01D 2257/708* (2013.01); *B01D 2257/91* (2013.01); *B01D 2258/06* (2013.01); *B01D 2259/40086* (2013.01); *B01D 2259/40088* (2013.01); *B01D 2259/4566* (2013.01); *Y02C 10/04* (2013.01); *Y02C 10/08* (2013.01); *Y02C 20/10* (2013.01)

(58) Field of Classification Search
    CPC ........ B01D 2253/104; B01D 2253/106; B01D 2253/108; B01D 2253/11; B01D 2253/204; B01D 2257/106; B01D 2257/402; B01D 2257/504; B01D 2257/708; B01D 2257/91; B01D 2258/06; B01D 2259/40086; B01D 2259/40088; B01D 2259/4566; B01D 53/04; B01D 53/0415; B01D 53/0438; B01D 53/1475; B01D 53/62; B01D 53/82; B01D 53/8668; B63G 8/36
See application file for complete search history.

(56) References Cited

U.S. PATENT DOCUMENTS

| | | | | |
|---|---|---|---|---|
| 3,344,050 | A | * | 9/1967 | Mayland ................ B01D 53/62 204/237 |
| 3,511,595 | A | * | 5/1970 | Fuchs .................... B01D 53/62 423/233 |
| 4,559,066 | A | | 12/1985 | Hunter et al. |
| 2003/0097086 | A1 | | 5/2003 | Gura |
| 2008/0216653 | A1 | * | 9/2008 | Paton-Ash ............. B01D 53/62 95/149 |
| 2011/0265648 | A1 | | 11/2011 | Meirav |
| 2011/0277490 | A1 | * | 11/2011 | Meirav .................. B01D 53/60 62/89 |
| 2012/0004092 | A1 | | 1/2012 | Raatschen et al. |

FOREIGN PATENT DOCUMENTS

| | | |
|---|---|---|
| WO | WO 02/08160 A1 | 1/2002 |
| WO | WO 2012/152930 A1 | 11/2012 |
| WO | WO 2012/158911 A2 | 11/2012 |

OTHER PUBLICATIONS

International Search Report and Written Opinion, mailed Sep. 2, 2014 for PCT International Application No. PCT/US2014/035114.
Supplementary European Search Report mailed Sep. 6, 2016 for EP Application No. EP14788461.3, filed Apr. 23, 2014.

* cited by examiner

REGENERABLE SORBENT $CO_2$ SCRUBBER FOR SUBMARINE VESSELS

CROSS-REFERENCE TO RELATED APPLICATIONS

This application is a 35 U.S.C. §371 national stage entry of PCT/US2014/035114, filed Apr. 23, 2014, entitled "Regenerable Sorbent $CO_2$ Scrubber For Submarine Vessels", which claims priority to U.S. Provisional Patent Application No. 61/814,839, filed Apr. 23, 2013, entitled "Regenerable Sorbent $CO_2$ Scrubber For Submarine Vessels", both disclosures of which are incorporated herein by reference in their entirety.

TECHNICAL FIELD

Embodiments of the present disclosure generally relate to systems, methods and devices relating to carbon dioxide scrubbers and more particularly to scrubbers for submarines and underwater vessels.

BACKGROUND

Submarines and/or underwater vessels represent a confined space with relatively high occupant density and, while underwater, do not have access to fresh air. The result may be a rapid increase in carbon dioxide ($CO_2$) concentration, which may be addressed by means of appropriate scrubbers. $CO_2$ scrubbers are routinely used in submarines, and they generally fall into two categories: non-regenerable, solid sorbent systems, that utilize sorbents such as sodium hydroxide in single use, consumable canisters; and regenerable liquid amine systems, that utilize a spray of monoethanolamine or similar amines in aqueous solution, and regenerate the solution periodically or in a continual loop by heating it to a high temperature so as to expel the $CO_2$. These methods present economic and operational disadvantages. The liquid spray system is complex, expensive, and consumes substantial amounts of energy to operate, which is particularly disadvantageous in submarines, and in particular, diesel powered submarines. Although they are forced to resurface frequently to operate the diesel engines, thus requiring a shorter-duration solution, they also have a much tighter energy budget making amine spray systems prohibitive. On the other hand, solid sorbents, are quickly consumed, thereby requiring the submarine to carry large quantities of canisters adding mass and volume to the submarine and allowing limited operating time before they need to return to shore to be replaced.

SUMMARY

Embodiments of the present disclosure provide systems, methods and devices for removing $CO_2$ (at least) from a cabin space of a submarine or an underwater vessel. Such embodiments may use regenerable solid-supported amine sorbents, or other regenerable $CO_2$ sorbents, configured to be repeatedly regenerated using, for example, standard, outside air when the submarine surfaces, and then be reused to adsorb $CO_2$ from the cabin as needed when the submarine is submersed (or otherwise sealed from the external environment) again. Such embodiments enable a submarine to use a compact scrubbing system over much longer offshore expeditions or operations (for example).

In some embodiments, a submarine $CO_2$ scrubbing system is provided. The system may comprise an assembly (which may be referred to as a "scrubbing assembly" or a "scrubber") including a sorbent, a scrubbing inlet in communication with the assembly and configured to receive a first airflow during an adsorption mode. The first airflow may comprise air received from a cabin of a submarine either directly or via one or more ducts. The assembly may be configured to flow the first airflow over and/or through the sorbent during the adsorption mode, such that the sorbent may remove at least a portion of $CO_2$ entrained in the first airflow. The system may include a scrubbing outlet in communication with the assembly and may be configured to expel the scrubbed first airflow from the assembly into the cabin, either directly or via one or more ducts during the adsorption mode. The system may include an outside air inlet in communication with outside air and the assembly and may be configured to receive a second airflow comprising outside air during a regeneration mode. The assembly may be additionally configured to direct the second airflow over and/or through the sorbent to regenerate the sorbent during the regeneration mode. The system may include a regeneration air outlet in communication with the assembly and configured to expel the second airflow after the second airflow has flowed over and/or through the sorbent during the regeneration mode. In some embodiments, at least one of the outside air inlet and regeneration air outlet may be configured to seal upon termination of the regeneration mode.

In some embodiments, the system may comprise a heater configured to heat at least one of the sorbent and the second airflow. The second airflow may be heated prior to the second airflow flowing over and/or through the sorbent. In some embodiments, the heater may comprise at least one of an engine of the submarine, a boiler of the submarine, a furnace of the submarine, a heat pump, and an electric coil.

In some embodiments, at least one of the outside air inlet and the regeneration air outlet may comprise at least one of an external hatch, a lid, and a damper. At least one of the external hatch, lid and damper may be configured for water-tight sealing.

In some embodiments, at least one of the outside air inlet and regeneration air outlet may be configured to extend outside the submarine, such that regeneration of the sorbent can be performed while the submarine is submerged.

In some embodiments, the system may further comprise one or more cartridges, the cartridges may be configured to contain the sorbent. The one or more cartridges may be additionally configured for removal and/or replacement. The one or more cartridges may comprise at least one of the following shapes: a rectangular sheet, a v-bank, and a hollow cylinder. The one or more cartridges may comprise a plurality of cartridges and each cartridge may contain a different type of sorbent.

In some embodiments, the system may further comprise one or more dampers, shutters, fans, and/or valves, configured to seal off the assembly from the first airflow during the regeneration mode.

In some embodiments, the second airflow may flow over and/or through the sorbent in a direction opposite to the flow of the first airflow, over and/or through the sorbent.

In some embodiments, the system may further include at least one of one or more passive particle filters, electrostatic particle filters, catalysts, ultraviolet sources, plasma sources, and ion generators. The system may further comprise at least one controller or control unit to control at least one of operation of the system, the one or more dampers, shutters, fans, valves, and/or heaters. The system may further comprise at least one sensor. The sensor may comprise a $CO_2$ sensor.

In some embodiments, a method for determining the mass (M) of a sorbent required for a submarine CO2 scrubbing system to operate a submarine over a predetermined period of time is provided. The method may comprise determining the efficiency of a sorbent for use with the scrubbing system, determining the total adsorption capacity of the sorbent, specifying a length of time that the submarine is to remain submerged, determining a rate of $CO_2$ production by occupants of a cabin of the submarine during the length of time, and specifying a maximum acceptable level of $CO_2$ at the end of each submersion, wherein:

$$M = \frac{\sigma}{s(t)} C(t)$$

and $C(t) = rt - VL(t)$, and wherein:

σ corresponds to the inverse of the total adsorption capacity of the sorbent,
s corresponds to the amount of $CO_2$ that has already collected on the sorbent, as a percent of the total CO2 adsorption capacity of the sorbent,
C corresponds to the cumulative amount of $CO_2$ adsorbed by the sorbent mass M,
L corresponds to the concentration of $CO_2$,
V corresponds to the volume of the cabin, and
r×t corresponds to the amount of $CO_2$ in the cabin produced by occupants of the submarine over time.

The maximum acceptable level of $CO_2$ may comprise a maximal concentration of $CO_2$ within the cabin allowed to maintain adequate air quality for the cabin occupants.

The method may further comprise determining an optimal temperature for regenerating the sorbent. Determining the optimal temperature may comprise determining at least one of: the type of sorbent, the time period for regenerating the sorbent, the lifespan of the sorbent, and the availability of heat or energy to raise the temperature of the sorbent to release adsorbed $CO_2$ and/or other contaminants.

In some embodiments, a method of submarine $CO_2$ air scrubbing using a regenerable sorbent is provided. The method may comprise providing a submarine $CO_2$ scrubbing system, determining a mass of regenerable sorbent necessary to operate the submarine for a predetermined period of time, scrubbing the first airflow during the adsorption mode, and regenerating the sorbent with the second airflow during the regeneration mode.

In some embodiments, a submarine is provided and may include a hull configured to seal before or upon submersion in and/or under water, propulsion means configured to provide energy for at least one of operating the hull in water, and a submarine $CO_2$ scrubbing system for scrubbing the first airflow and regenerating the sorbent via the second airflow.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The principles and operations of the systems, apparatuses and methods according to some embodiments of the present disclosure may be better understood with reference to the drawings, and the following description. The drawings are given for illustrative purposes only and are not meant to be limiting.

DETAILED DESCRIPTION OF SOME OF THE EMBODIMENTS

FIGS. 1-5, are schematic illustrations of an exemplary submarine cabin $CO_2$ scrubbing system 10, according to some embodiments of the present disclosure.

Figure 1:
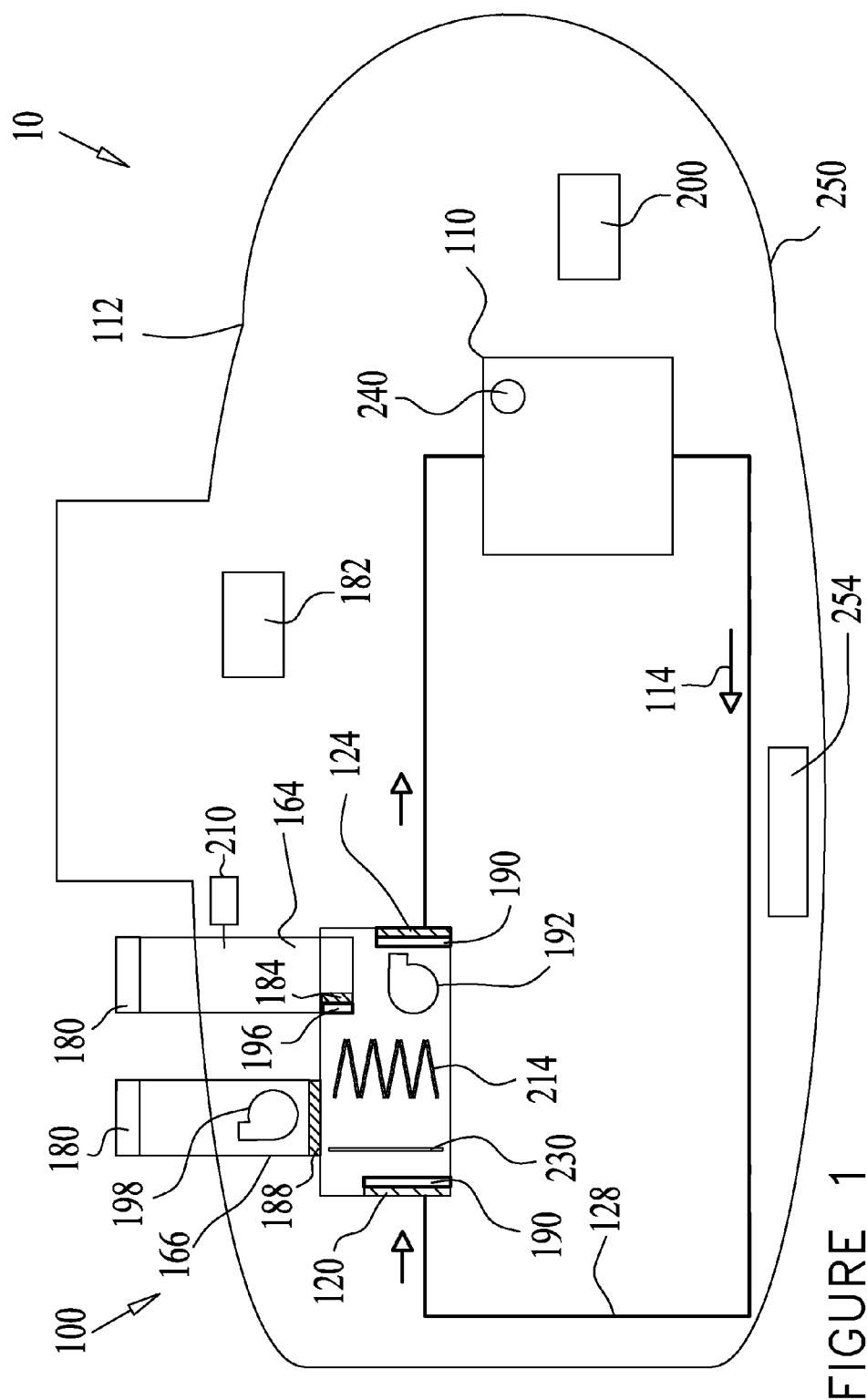
FIG. 1 is a schematic illustration of an exemplary submarine cabin $CO_2$ scrubbing system, according to some embodiments of the present disclosure.

As seen in FIG. 1, the scrubbing system 10 may comprise a $CO_2$ scrubbing assembly 100. The scrubbing assembly 100 may be configured in gaseous communication with a cabin space 110 of a submarine 112 or any other water vessel.

Cabin air 114 from the cabin space 110 may flow into the scrubbing assembly 100 through an entry port 120 and may exit the scrubbing assembly 100 from an exit port 124, where it flows back to the cabin space 110. The entry port 120 may comprise a scrubbing inlet in communication with the scrubbing assembly 100 and may be configured to receive a first airflow comprising cabin air 114 during an adsorption mode. The cabin air 114 may comprise the cabin air 114 from the cabin space 110 of the cabin of the submarine 112 either flowing directly or via one or more ducts into the scrubbing assembly 100.

The exit port 124 may comprise a scrubbing outlet in communication with the scrubbing assembly 100 and may be configured to expel the scrubbed cabin air 114 from the scrubbing assembly 100 to the cabin space 110 of the cabin either directly or via one or more ducts, during the adsorption mode.

At least a portion of the cabin air 114 may circulate within an air duct 128 from the cabin space 110 to the scrubbing assembly 100 and back.

In some embodiments, the scrubbing assembly 100 may be configured to flow the cabin air 114 over and/or through the sorbent during an adsorption mode such that the sorbent removes at least a portion of $CO_2$ entrained in the cabin air 114.

Figure 2:
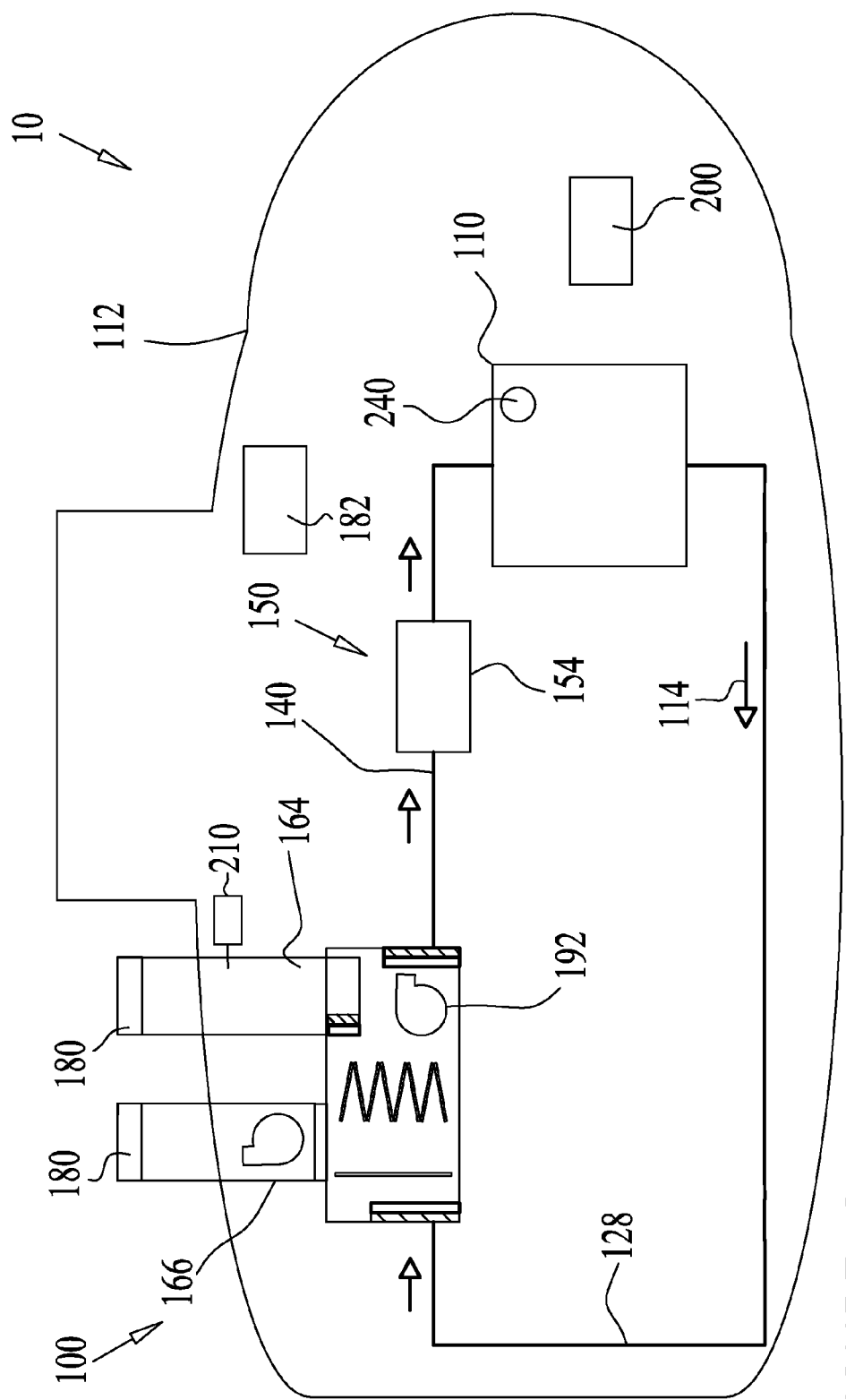
FIG. 2 is a schematic illustration of an exemplary submarine cabin $CO_2$ scrubbing system, according to some embodiments of the present disclosure.

In some embodiments, as shown in FIG. 1, the air duct 128 may connect directly to the cabin space 110 in one or more locations. In some embodiments, as shown in FIG. 2, the scrubbing assembly 100 may connect to main air ducts 140. Main air ducts 140 may be configured to circulate air in the cabin space 110 and between the cabin space 110 and an air handling system 150 comprising an air handling unit 154. The air handling system 150 may comprise a central heating, ventilation and air conditioning (HVAC) system.

Figure 3:
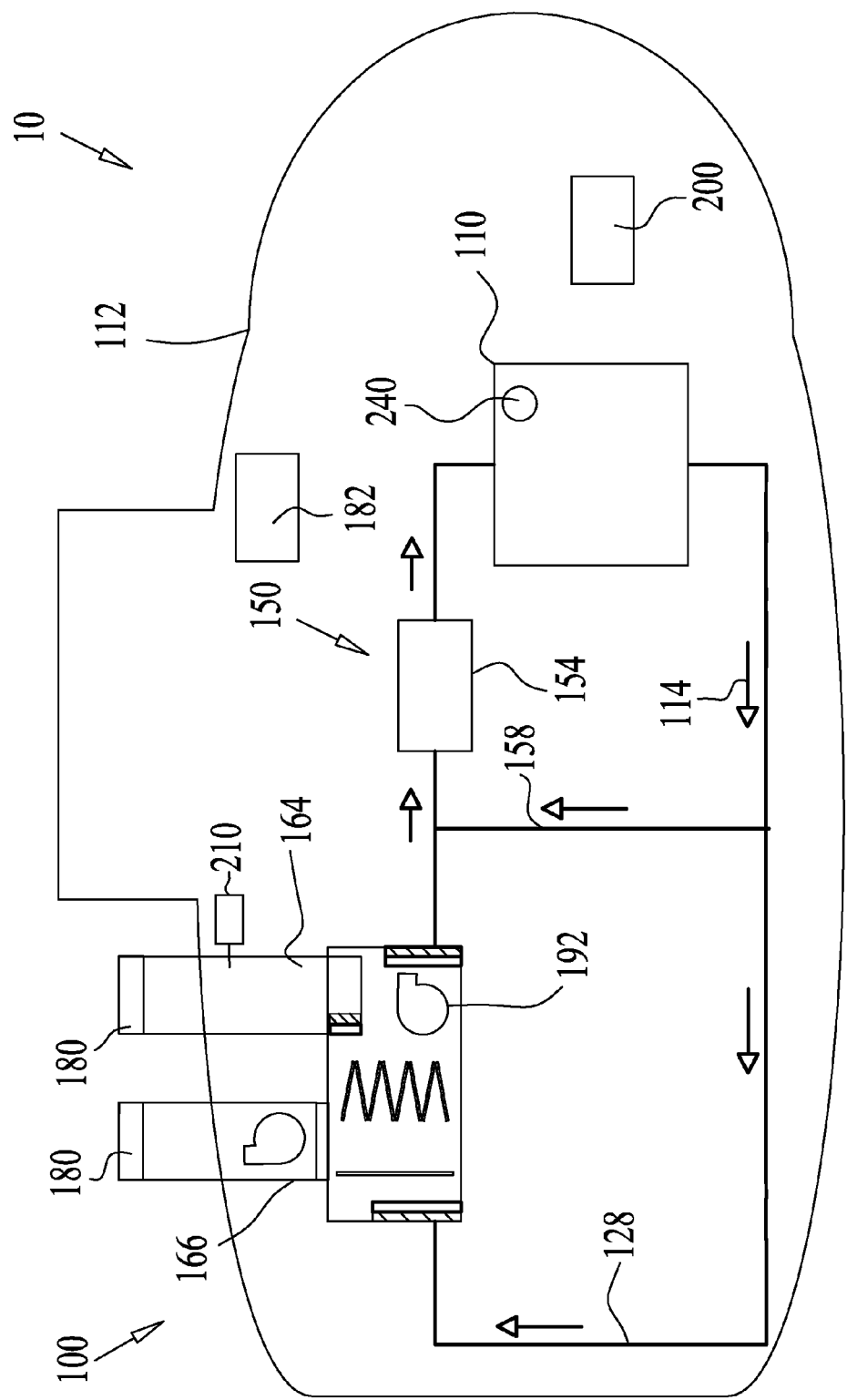
FIG. 3 is a schematic illustration of an exemplary submarine cabin $CO_2$ scrubbing system, according to some embodiments of the present disclosure.

As seen in FIG. 3, the scrubbing assembly 100 may be configured to intercept a fraction of the circulating cabin air 114 on its path, via ducts 128, through the air handling system 150, allowing the remaining fraction to proceed directly to the air handling unit 154, via ducts 158. This may be sufficient to remove the necessary amounts of $CO_2$ and any other contaminants. In some embodiments, between approximately 1% to approximately 50% of the cabin air 114 may be diverted to the scrubbing assembly 100. In some embodiments, between approximately 3% to approximately 25% of the cabin air 114 may be diverted to the scrubbing assembly 100. In some embodiments, between approximately 5% to approximately 15% of the cabin air 114 may be diverted to the scrubbing assembly 100. In other embodiments, substantially all of the cabin air is intercepted and scrubbed.

The flow of cabin air 114 into the scrubbing assembly 100 and/or thereout may be controlled by one or more dampers 190 and/or fans 192.

The scrubbing assembly 100 may contain a solid sorbent material that can adsorb $CO_2$. In some embodiments, the sorbent comprises a granular material. The granular material may be contained in a permeable structure so that the cabin air 114 flowing through the scrubbing assembly 100 can be forced into contact with the sorbent. In some embodiments, the sorbent is formed in sheets of permeable material, such that the cabin air 114 can be urged to flow through the sheets. Accordingly, as the cabin air 114 flows through the scrubbing assembly 100, $CO_2$ is removed from the flowing cabin air 114 as it is captured by the sorbent.

Regenerable solid sorbents for $CO_2$ may include, for example, solid supported amines, clays, zeolites, natural zeolite, molecular sieves, activated charcoal, carbon particles of any size, metal organic frameworks, alkaline salts, silica, silica gel, alumina, porous alumina, titanium oxide, other porous minerals and oxides, carbon fibers and/or activated carbon, polymers or fiber based materials. In some embodiments, solid supported amines are used as the sorbent, wherein the solid support can be clay, a mineral, a porous solid, or a powder such as silica, alumina or carbon. An exemplary suitable $CO_2$ adsorbent material may be a granular adsorbent particles or solid support material supporting an amine-based compound, such as disclosed in applicant's PCT application PCT/US12/38343. The amine can be any of a number of organic amines including but not limited to monoethanolamine, diethanolamine, polyethylenimine, tetraethylenepentamine, pentaethyleneheptamine, or any other suitable amine.

Figure 4:
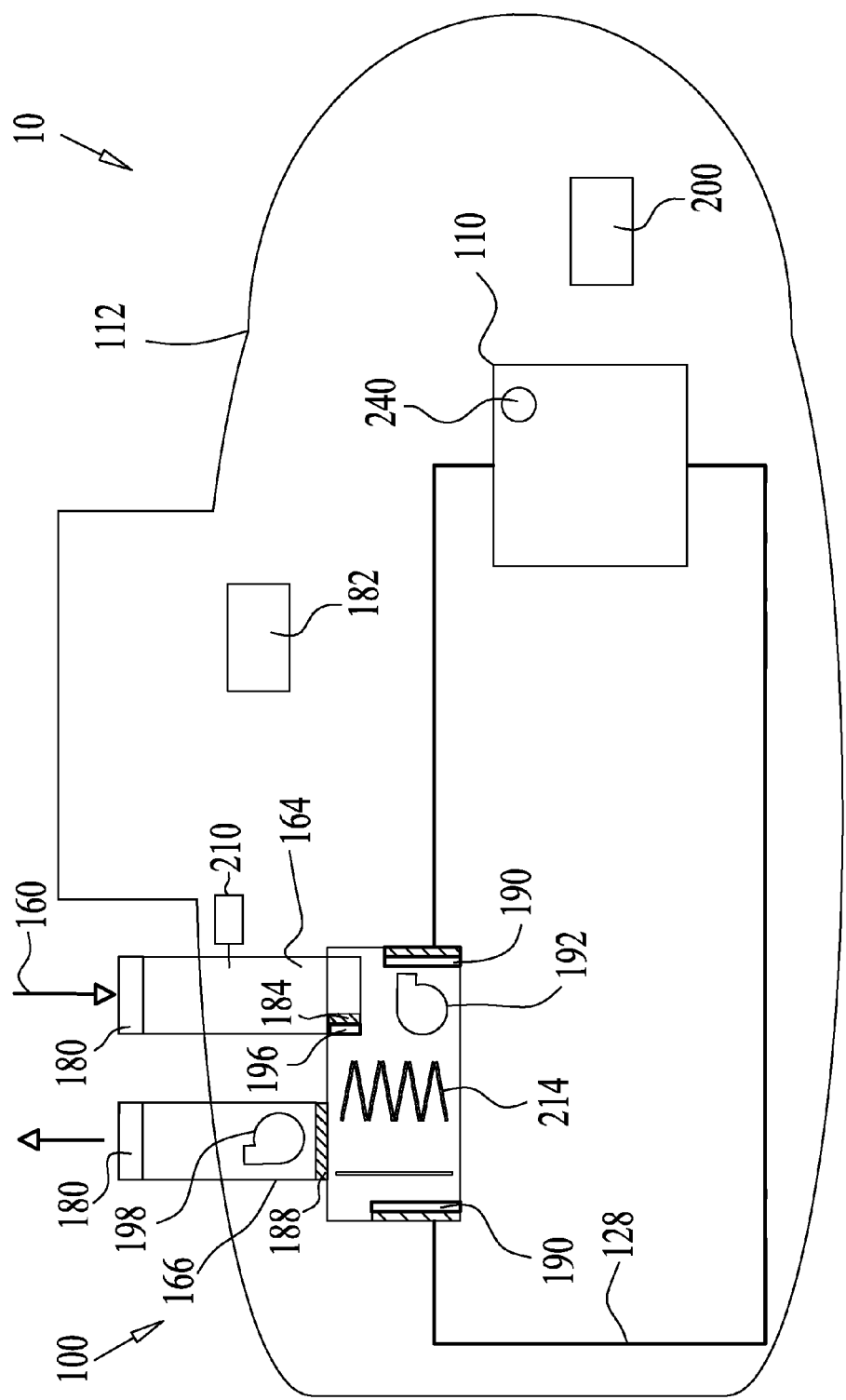
FIG. 4 is a schematic illustration of an exemplary submarine cabin $CO_2$ scrubbing system, according to some embodiments of the present disclosure.
Figure 5:
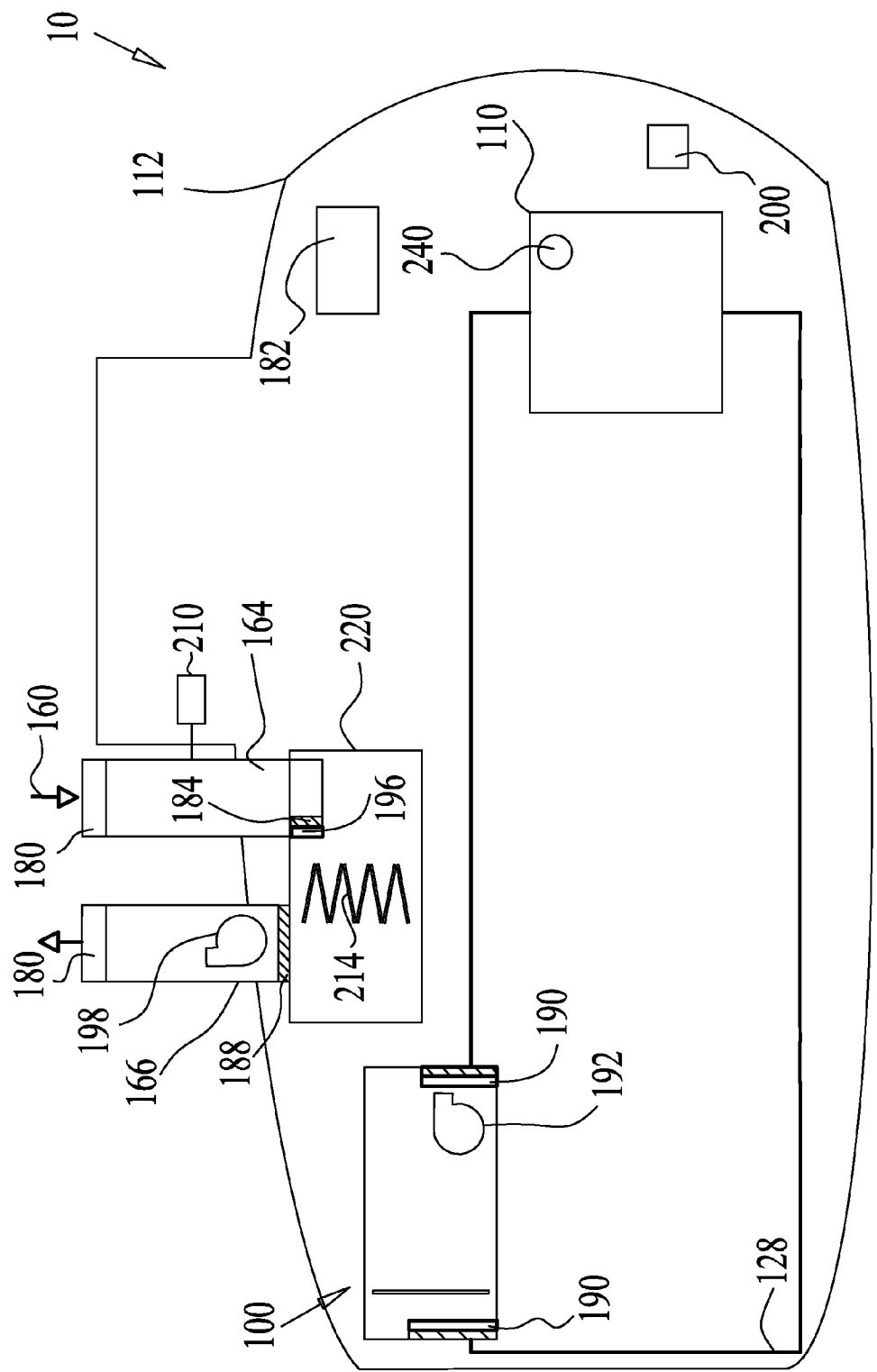
FIG. 5 is a schematic illustration of an exemplary submarine cabin $CO_2$ scrubbing system, according to some embodiments of the present disclosure.

In FIGS. 1-3 system 10 is shown operating in an adsorption mode, where $CO_2$ contained in cabin air 114 can be adsorbed by the sorbent. An important feature of some embodiments of the present disclosure, is the capability to regenerate the sorbent using, for example, outside air 160, as seen in FIGS. 4 and 5, which illustrate an exemplary regeneration mode. In some embodiments, the regeneration mode may be activated (either manually or automatically) when the submarine 112 surfaces and has access to outside, atmospheric air (or is otherwise in a position to access outside air).

The scrubbing assembly 100 may comprise two ducts, an inlet duct 164 and outlet duct 166 extending to the exterior of the submarine 112. In some embodiments, the inlet duct 164 and/or the outlet duct 166 are sealed by a lid, external hatch 180 or other type of sealing (e.g., water-tight seal) element when the submarine 112 is submerged underwater (e.g., or otherwise exposed to water). In other embodiments, the ducts 164 and 166 are contained within the submarine 112, and upon surfacing of the submarine 112, can be extended to outside the submarine 112 with the help of flexible ducts or detachable extensions, that can be extended outside of the submarine 112 to access fresh, outside air 160 for regenerating the sorbent scrubbing assembly 100 (which may be extended even when the submarine is submerged). Extending the ducts 164 and 166 may be performed in any suitable manner, such as manually by an operator or automatically by a controller 182 or a combination thereof. The inlet duct 164 may be attached to an outside air inlet 184 and the outlet duct 166 may be attached to a regeneration air outlet 188.

In some embodiments, the outdoor air inlet 184 and/or the regeneration air outlet 188 may comprise at least one of the lid or an external hatch 180, and/or a damper, such as a damper 196. In some embodiments, the external hatch, lid and/or damper may be configured for water-tight sealing.

When the submarine 112 is at the surface, the hatch 180 may be opened, allowing outside air 160 to flow in and out of the scrubbing assembly 100, whereby the scrubbing assembly 100 is flushed with fresh, outside air 160 so as to purge the sorbent from the adsorbed $CO_2$ and any other adsorbed contaminants. The cabin air flow in the scrubbing assembly 100 may be further controlled by one or more dampers 196 and/or fans 198.

In some embodiments, the outside air inlet 184 may be in communication with the outside air 160 and the scrubbing assembly 100. The outside air inlet 184 may be configured to receive a second airflow, comprising outside air 160, during a regeneration mode, wherein the scrubbing assembly 100 may be additionally configured to direct the second airflow over and/or through the sorbent to regenerate the sorbent. In some embodiments, the outside air inlet 184 may be configured to seal the scrubbing assembly 100 upon the termination of the regeneration mode.

The regeneration air outlet 188 may be in communication with the scrubbing assembly 100 and may also be configured to expel the second airflow after the second airflow has flowed over and/or through the sorbent during the regeneration mode. In some embodiments, the outside air inlet 184 may be configured to seal the scrubbing assembly 100 upon the termination of the regeneration mode.

In some embodiments, outside air 160 used to purge the sorbent, may be heated to accelerate the release of the $CO_2$. The heating of the purge air (e.g., the second airflow) can be achieved by any number of means. In one embodiment, the purge air (comprising the outside air 160) is heated by a heater 210, and/or the sorbent itself may be heated by the heater. The heater may comprise, for example, the submarine's 112 engines, boilers and/or furnaces 200. In some embodiments, the heater 210 may comprise an electric coil or a heat pump. Other means of heating the purge air and/or the sorbent can be employed as long as it can bring the purge air to a desired temperature for regenerating the sorbent.

In some embodiments, the optimal temperature for regeneration of the sorbent depends on at least one of a number of factors. For example, one factor is the choice of the sorbent, as each type of sorbent includes a corresponding release temperature, whereby $CO_2$ adsorbed by the sorbent is released from the sorbent. Other factors may include regeneration time, longevity of the sorbent, and the availability of heat or energy to raise the temperature of the sorbent to release adsorbed $CO_2$ and/or other contaminants.

In some embodiments, no heat may be required for the purge air and/or sorbent to regenerate the sorbent, for example, if the submarine 112 spends a sufficient amount of time near the surface for regeneration with unheated outside air.

In some embodiments, to facilitate the regeneration, the sorbents can be regenerated at relatively low temperatures and modest pressure swing. In some embodiments the relatively low temperatures may be between about 50°-70° C. In some embodiments the relatively low temperatures may be between about 40°-90° C. In some embodiments the relatively low temperatures may be between about 30°-120° C. In a non-limiting example, the modest pressure swing may be less than one bar of static pressure difference between the adsorption mode and the regeneration mode.

In some embodiments, regeneration may be performed in-situ without removing the sorbent from the scrubbing assembly 100, such as seen in FIG. 4.

As earlier indicated, in some embodiments, the sorbent may be heated before access to outside air 160 is available (e.g., as when the submarine 112 is still submerged), and may be heated in addition to or in place of heating the outside/purge air. In such embodiments, pre-heating the sorbent before surfacing may shorten the amount of time the submarine 112 may be required to spend at the surface to complete the regeneration of the sorbent. Preheating and subsequent regeneration of the sorbent can be performed within the scrubbing assembly 100, as shown for example in FIG. 4.

In some embodiments, as shown for example in FIG. 5, the sorbent may be heated by removing a permeable structure in which the sorbent is contained, such as a cartridge(s) 214, from the scrubbing assembly 100 and placing it in a separate regeneration enclosure or regeneration chamber 220 where it may be heated and subsequently flushed with a purging airflow (e.g., outside air) for regeneration thereof. In some embodiments, if a separate regeneration chamber 220 is available, the scrubbing assembly 100 itself can be simplified by eliminating the need for multiple ports and dampers.

The cartridges 214 may be configured for ease of removal from the scrubbing assembly 100, and/or replacement, without, for example, removing other parts of the scrubbing assembly 100 from the submarine 112.

In some embodiments, the sorbent can be first regenerated when the submarine surfaces and thereafter used repeatedly at specific times upon the submarine 112 being submerged (or sealed from outside environment/air).

In some embodiments, the outside air inlet 184 and/or the regeneration air outlet 188 may be configured to extend outside the submarine 112 above the surface, such that regeneration of the sorbent can be performed while the submarine 112 is submerged. As earlier noted, ducts 164 and/or 166 may be utilized to extend outside the submarine 112 above the surface, for flow of outside air therein and/or thereout.

In accordance with some embodiments, there is provided a method for determining the mass (M) of the sorbent required for the submarine $CO_2$ scrubbing system 10 to operate the submarine 112 over a predetermined period of time.

The method may determine, for example, an optimal mass (M) of the sorbent allowing use of a determined (e.g., minimal) sorbent mass, yet a mass which is sufficient to efficiently scrub $CO_2$ by the submarine $CO_2$ scrubbing system 10. In some embodiments, providing a relatively low mass scrubbing system may be greatly advantageous in a submarine.

The total mass of sorbent M (such as in kilograms, or any other unit) required for a given submarine 112 may depend on one or more of the following (in some embodiments, several of the following, and in still other embodiments, all of the following): properties of the sorbent, the length of time, T, measured in hours (or any other unit), that the submarine 112 is specified to remain submerged, a rate of $CO_2$ production by the cabin occupants, r, in grams per hour (or any other unit), and the maximum acceptable level of $CO_2$ at the end of each submersion. The maximum acceptable level of $CO_2$ may be defined as the maximal concentration of $CO_2$ within the cabin space allowed to maintain adequate or livable air quality for the cabin occupants. A calculation model may be used based on at least one of the parameters for determining the sorbent mass.

Determining the mass (M) of the sorbent required for the submarine $CO_2$ scrubbing system 10 may be performed by a computer including a processor and a non-transitory machine-readable medium.

For example, a method to calculate M may include determining the efficiency of the sorbent for use with the scrubbing system 10, determining the total adsorption capacity of the sorbent, specifying a length of time that the submarine 112 is to remain submerged, determining a rate of $CO_2$ production by occupants of the submarine cabin 110 during the length of time, and specifying a maximum acceptable level of $CO_2$ at the end of each submersion To that end:

$$M = \frac{\sigma}{s(t)} C(t)$$

and $C(t) = rt - VL(t)$ and

σ corresponds to the inverse of the total adsorption capacity of the sorbent, s corresponds to the amount of $CO_2$ that has already collected on the sorbent, as a percent of the total CO2 adsorption capacity of the sorbent, C corresponds to the cumulative amount of $CO_2$ adsorbed by the sorbent mass M, L corresponds to the concentration of $CO_2$, V corresponds to the volume of the cabin, and rxt (which can be written as rt) corresponds to the amount of $CO_2$ in the cabin produced by occupants of the submarine over time.

An optimal temperature for regenerating the sorbent may be further determined by at least one of: the type of sorbent, the time period for regenerating the sorbent, the lifespan of the sorbent, and the availability of heat or energy to raise the temperature of the sorbent to release adsorbed $CO_2$ and/or other contaminants.

For example, the method for determining the mass (M) of a sorbent required for a submarine CO2 scrubbing system 10 to operate the submarine 112 over a predetermined period of time may include the following calculation model: the concentration of $CO_2$ (in fraction of volume) may be referred to as L(t), indicating that it varies with time, and the maximum acceptable concentration of $CO_2$ may be referred to as $L_{max}$. At any point in time the scrubbing assembly 100 has incoming cabin air 114 flowing at a fixed volumetric flow rate off (typically measured in CFM, as in cubic feet per minute, or liters per second or cubic meters per hour) and with a $CO_2$ level of $L_{in}(t) = L(t)$. The outgoing air emerging from the scrubbing assembly 100 has a $CO_2$ concentration of $L_{out}(t)$. The efficiency of the sorbent, E, may be defined as the fraction of the $CO_2$ that is successfully removed from the airstream relative to its incoming level, in other words $$E \equiv \frac{L_{in} - L_{out}}{L_{in}}$$

The actual value of E(t) at any point in time may be dictated by the material properties and the physics of the adsorption of the $CO_2$ by the sorbent. These adsorption physics may depend on, for example, the cabin air temperature, the flow velocity of the cabin air, a thickness of a sorbent bed, or presence of other gas species. The properties of the sorbent may include its chemical properties, porosity, particle size and history, such as the number of regeneration cycles the sorbent has undergone. For a fixed temperature and flow configuration, the efficiency varies with the concentration of $CO_2$ in the air, L, and also varies with the amount of $CO_2$ that has already been collected on the sorbent, as a percent of its total capacity, which is denoted by s. The sorbent and the scrubbing assembly 100 can be characterized by an empiric functional dependency:

$$E(t) = E\{L(t), s(t)\}$$

As s increases the efficiency generally declines and eventually reaches zero as the sorbent becomes saturated. The value of s is given by the product of a constant, denoted by σ, which is the inverse of the total adsorption capacity of the sorbent, expressed, for example, in terms of gram $CO_2$ per kilograms sorbent, and the ratio of C, the cumulative amount of $CO_2$ adsorbed to the total mass of the sorbent, M.

$$s(t) = \frac{\sigma}{M} C(t)$$

On the other hand the rate of capture of $CO_2$ on the sorbent, c(t), can be determined using the definition of efficiency, whereby the capture rate is given by product of the flow rate, the incoming concentration and the efficiency:

$$c(t) = fL(t)E(t)$$

The cumulative value C may be the time integral of the capture rate c, namely $$C(t) = \int_0^t c(t') dt' = \int_0^t fL(t')E(t') dt'$$

It is noted that L(t), the concentration of $CO_2$, may be determined by the net amount of $CO_2$ in the cabin air divided by the volume of the cabin space, V. The amount of $CO_2$ in the cabin space 110 is the amount produced by the occupants over time, r×t (which can be written as rt), less the amount removed from the cabin air 114 by the scrubbing assembly 100, C(t). Therefore the concentration may be given by:

$$L(t) = \frac{rt - C(t)}{V}$$

Or equivalently $$C(t) = rt - VL(t)$$

Which can be turned into an integral equation as follows $$C(t) = f \int_0^t L(t')E(t') dt' = \frac{f}{V} \int_0^t [rt' - C(t')]E(L(t'), s(t')) dt'$$

This can be further reduced to a single time dependent variable C(t) by inserting the expressions for L and s:

$$C(t) = \frac{f}{V} \int_0^t [rt' - C(t')]E\left\{\frac{rt' - C(t')}{V}, \frac{\sigma}{M}C(t')\right\} dt'$$

This may also be expressed as a closed form integral equation for C(t). It can also be converted to a differential equation form:

$$\frac{dC}{dt} = \frac{f}{V}[rt - C]E\left\{\frac{rt - C}{V}, \frac{\sigma}{M}C\right\}$$

These equations, in either version, may be solved numerically using the empiric form E{L,s} of the sorbent characteristic. The solution of this equation may provide the basis for determining the required amount of sorbent, M, to enable an extended submersion time T without having L exceed $L_{max}$. Such solutions may be used to obtain the required sorbent mass and scrubbing assembly 100 dimensions (e.g. volume, length, width) for specific submarine applications.

The example set forth herein is meant to exemplify various aspects of the disclosure and is not intended to limit in any way.

EXAMPLE

Figure 6A:
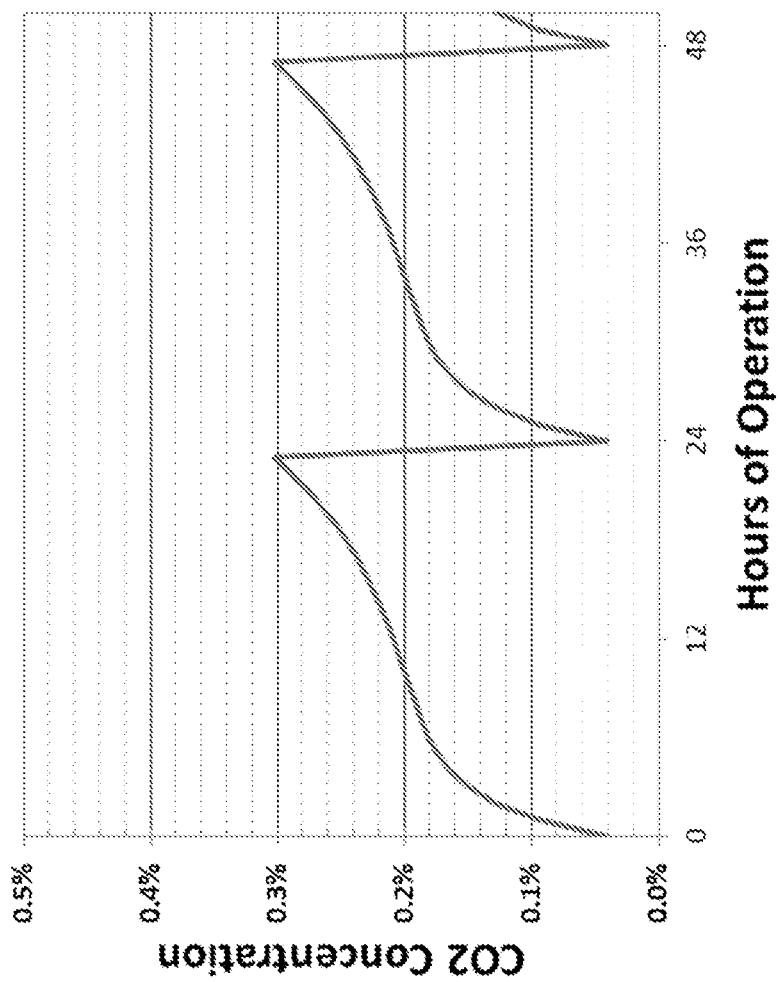
FIGS. 6A-6C are each a graph showing an adsorption mode of an exemplary submarine cabin $CO_2$ scrubbing system according to some embodiments of the present disclosure.
Figure 6B:
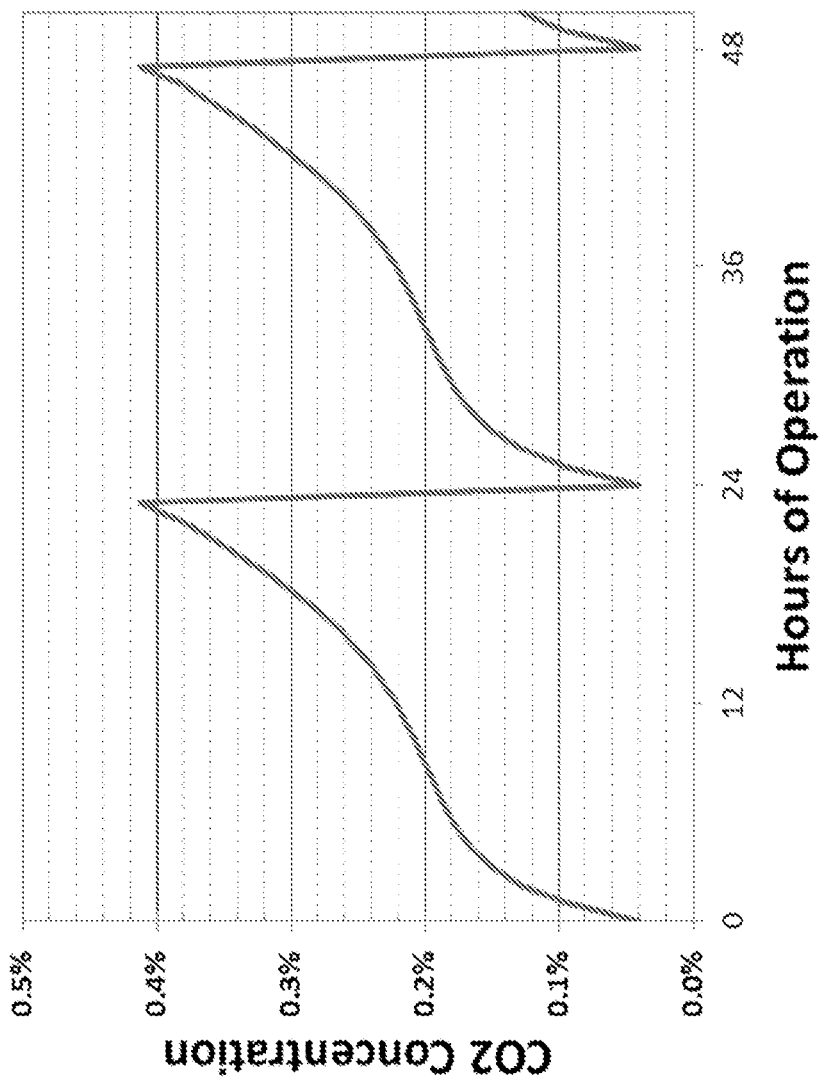
Figure 6C:
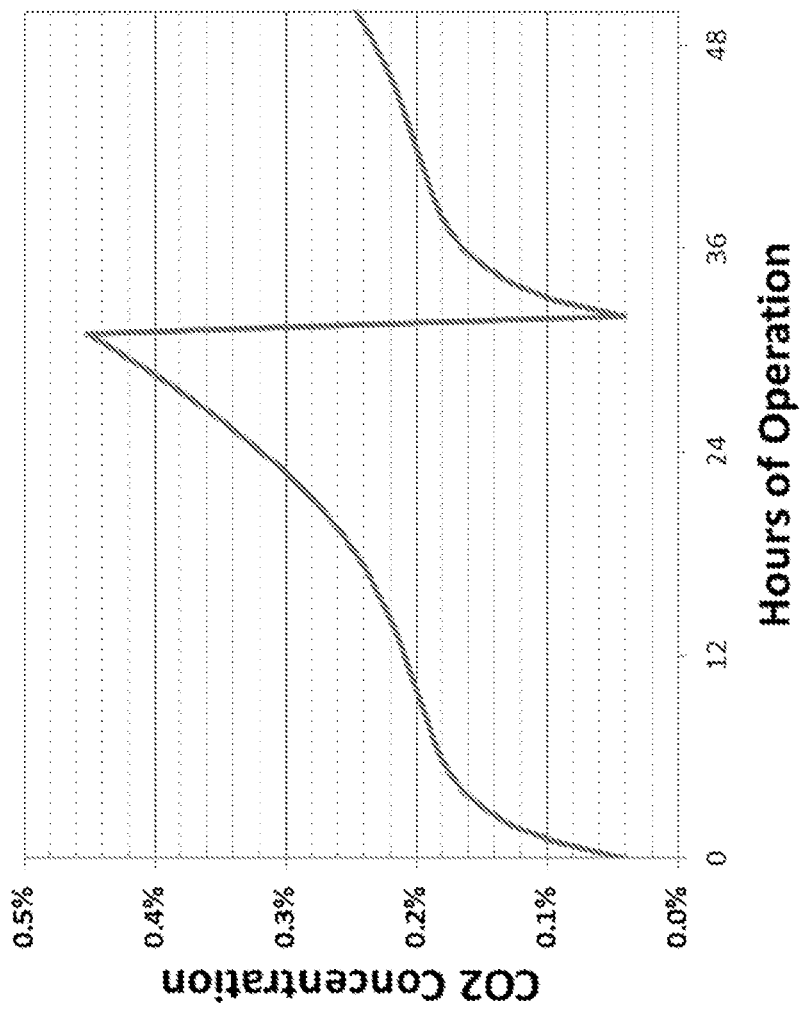

Reference is made to FIGS. 6A-6C, which are each a graph showing an exemplary adsorption mode of the submarine cabin $CO_2$ scrubbing system 10 according to some embodiments of the present disclosure and in accordance with the calculation model described hereinabove.

In FIGS. 6A-6C the graphs show results of the above calculation model for a case of a submarine with a volume of 1000 cubic meters and an occupancy of 45 crew members, where it is estimated that r=1350 gr/hour. Such calculations can be performed with different assumptions and parameters. The sorbent characteristics used in the calculation model are those measured for a high performance granular amino-clay sorbent. In FIG. 6A the amount of the sorbent is 1000 kilograms and the submarine operated in a submersion-surfacing cycle of 24 hours. Under these conditions $CO_2$ levels are maintained below 0.3% or 3000 parts per million (ppm) at all times.

In FIG. 6B 750 kilograms of sorbent are used and at the end of each cycle $CO_2$ levels reach slightly above 0.4% or 4000 ppm.

In FIG. 6C the impact of a longer submersion cycle of 32 hours is shown with the same 1000 kilograms sorbent as in FIG. 6A, here the $CO_2$ concentrations reach as high as 4500 ppm.

In accordance with some embodiments, the sorbent in the scrubbing assembly 100 can be contained in one or more cartridges 214, schematically illustrated in FIGS. 1-5. The cartridges 214 may be designed removal ease and/or replacement, when necessary. The cartridges 214 can have any of a number of shapes or forms, including but not limited to rectangular sheet, v-bank, or hollow cylinders. Any suitable shape or form may be used for fluid filtration.

Many sorbents, even if regenerable, have a finite lifespan and may require periodic replacements. Thus, cartridge 214 may be configured so as to be easily removed and replaced periodically as needed, without having to remove the entire scrubbing assembly 100.

Other sorbent forms can be used. Sheet sorbent, including fiber, cellulose, polymer, and other paper or cloth forming sorbents are configured to effectively remove certain contaminants, including $CO_2$. In certain embodiments, solid particles of the preferred sorbent are attached to a sheet of paper, cloth or similar permeable material. The sheet can be pleated to increase surface area and sorbent volume while allowing air to flow through the material.

More than one kind of sorbent can be incorporated into a cartridge 214 or alternatively the scrubbing assembly 100 can have different types of sorbents in different cartridges 214, to enable the removal of multiple species of contaminants.

The regeneration of the sorbent may be accomplished, according to some embodiments, by flowing outside air 160 through the sorbent material. During the regeneration mode, the scrubbing assembly 100 may be sealed off from the cabin space 110 by means of dampers 190 (which may be automatic), shutters and/or valves.

In some embodiments the regeneration airflow can be in the opposite direction as that of the cabin airflow as shown for example in FIG. 4, or the same direction.

The operation of the scrubbing assembly 100 can be entirely automated with electronic controls affecting the fans and dampers associated with the air handling system 150.

The scrubbing assembly 100 can have other air treatment components 230 or enclosed in a cartridge 214, to perform other types of cleansing or air quality functions, for removing certain unwanted species of contaminants, including unwanted compounds, such as Volatile Organic Compounds (VOC), ozone, nitrous oxides, sulfur oxides, carbon monoxide, additional gases and vapors, as well as particles, microorganisms, bacteria, viruses, molds, fungi, fumes, smoke and dust, which may further affect cabin air quality. Examples of air treatment components may include one or more: passive particle filters, electrostatic particle filters, catalysts ultraviolet sources for sterilization or for catalyzing unwanted compounds, plasma sources, chemical cleaning component, an electrostatic particle trap or filter ionizers or, ion generators.

In some embodiments, there may be provided a control unit such as controller 182, for example, for the system to control the operation of the dampers, fans (and shutters and/or valves, if provided) and heaters of the system 10. The control unit may utilize one or more sensors, such as for example a $CO_2$ sensor 240, to monitor and control the operation of the system 10 for removing $CO_2$.

As seen from the embodiments of FIGS. 1-6C there is provided a submarine $CO_2$ scrubbing system 10 including the scrubbing assembly 100, which may comprise a $CO_2$ sorbent wherein at least a fraction of the cabin air 114 flows therethrough for absorption of at least a portion of the $CO_2$ and/or other contaminates in the cabin air 114. The sorbent may be configured to be repeatedly regenerated for removal of at least a portion of the adsorbed $CO_2$ and/or other contaminates from the sorbent. The sorbent regeneration may be performed by outside air which can provide a compact scrubbing assembly 100 using less mass and/or volume of a sorbent, which would have otherwise been required for a non-regenerable sorbent. By providing a relatively low mass and/or volume scrubbing system may be greatly advantageous in a submarine. Additionally, in some embodiments, during the adsorption mode a fraction of the cabin air 114 flows through the sorbent by means of fans, shutters, dampers and/or valves or any other suitable means, which generally require less energy to operate in comparison to other submarine scrubbing systems. Moreover, in a regeneration mode, the sorbent may be regenerated by outside air, thereby requiring less energy than other regeneration methods (i.e., since available outside air is used).

Submarine 112 may comprise a hull 250 (FIG. 1) configured to seal before or upon submersion in and/or under water and a propulsion means 254 configured to provide energy for operating and/or propelling the hull 250 in water. In a non-limiting example, the propulsion means 254 may comprise an engine, such as a diesel engine. The submarine 112 further comprises the submarine $CO_2$ scrubbing system 10. It is noted that "cabin space" may be referred to as a "cabin". It is also noted that the term "submarine" used throughout the specification may include any underwater vessel, or water vessel which may be sealed from outside air.

With reference to FIGS. 1-6C, any other suitable means besides fans or dampers, such as valves, shutters or blowers, may be used to control and/or urge flow of cabin air 114 into the scrubbing assembly 100 and/or for urging the flow of the outside air 160 over and/or through the sorbent for regeneration thereof.

In FIGS. 1-5 the cabin air 114 is shown flowing to the scrubbing assembly 100 via ducts, such as ducts 128 in FIG. 1. In some embodiments, the scrubbing assembly 100 may be placed within the cabin space 110 or at any other suitable location and the cabin air 114 may flow directly therein and thereout.

The controller 182 or control unit may include computer code operational thereon which may be configured to control the cabin air 114 and the outside air 160, and cycling between adsorption and regeneration modes.

As noted above, and in particular, those embodiments which involve at least some of the processes discussed (or portions thereof), may be realized in digital electronic circuitry, integrated circuitry, specially configured ASICs (application specific integrated circuits), computer hardware, firmware, software, and/or combinations thereof. These various implementations, such as associated with the controller 182 or control unit, for example, may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Such computer programs (also known as programs, software, software applications or code) include machine instructions/code for a programmable processor, for example, and may be implemented in a high-level procedural and/or object-oriented programming language, and/or in assembly/machine language. As used herein, the term "machine-readable medium" refers to any computer program product, apparatus and/or device (e.g., non-transitory mediums including, for example, magnetic discs, optical disks, flash memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a LCD (liquid crystal display) monitor and the like) for displaying information to the user and a keyboard and/or a pointing device (e.g., a mouse or a trackball, touchscreen) by which the user may provide input to the computer. For example, this program can be stored, executed and operated by the dispensing unit, remote control, PC, laptop, smart-phone, media player or personal data assistant ("PDA"). Other kinds of devices may be used to provide for interaction with a user as well. For example, feedback provided to the user may be any form of sensory feedback (e.g., visual feedback, auditory feedback, or tactile feedback), and input from the user may be received in any form, including acoustic, speech, or tactile input. Certain embodiments of the subject matter described herein may be implemented in a computing system and/or devices that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components.

The components of the system may be interconnected by any form or medium of digital data communication (e.g., a communication network). Examples of communication networks include a local area network ("LAN"), a wide area network ("WAN"), and the Internet. The computing system according to some such embodiments described above may include clients and servers. A client and server are generally remote from each other and typically interact through a communication network. The relationship of client and server arises by virtue of computer programs running on the respective computers and having a client-server relationship to each other.

Any and all references to publications or other documents, including but not limited to, patents, patent applications, articles, webpages, books, etc., presented anywhere in the present application, are herein incorporated by reference in their entirety.

Example embodiments of the devices, systems and methods have been described herein. As may be noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any and all elements/features from any other disclosed methods, systems, and devices, including any and all features corresponding to $CO_2$ and/or contaminant air scrubbing for a submarine. In other words, features from one and/or another disclosed embodiment may be interchangeable with features from other disclosed embodiments, which, in turn, correspond to yet other embodiments. Furthermore, one or more features/elements of disclosed embodiments may be removed and still result in patentable subject matter (and thus, resulting in yet more embodiments of the subject disclosure). Also, the lack of one or more features, structure, and/or steps for one and/or another embodiment as compared to the prior art which includes such a feature(s), structure, and/or step(s) provides yet additional patentable embodiments for the present disclosure (e.g., negative claim limitations).

What we currently claim:

1. A submarine $CO_2$ scrubbing system, comprising:
an assembly including a sorbent, the assembly configured to operate in at least two modes of operation including an adsorption mode and a regeneration mode;
a scrubbing inlet in communication with the assembly and configured to receive a first airflow during the adsorption mode,
wherein:
the first airflow comprising air received from a cabin of a submarine either directly or via one or more ducts,
during the adsorption mode, the assembly is configured to flow the first airflow over and/or through the sorbent so as to remove at least a portion of $CO_2$ entrained in the first airflow;
a scrubbing outlet in communication with the assembly and configured to expel the scrubbed first airflow from the assembly into the cabin either directly or via one or more ducts during the adsorption mode;
an outside air inlet in communication with outside air and the assembly;
a regeneration air outlet in communication with at least the assembly,
wherein during the regeneration mode:
the outside air inlet is configured to receive a second airflow comprising outside air,
the assembly directs the second airflow over and/or through the sorbent to release $CO_2$ so as to regenerate the sorbent,
the regeneration air outlet is configured to expel the second airflow after the second airflow has flowed over and/or through the sorbent, and
at least one of the outside air inlet and regeneration air outlet is configured to seal upon termination of the regeneration mode;
heating means configured to heat at least one of the sorbent and the second airflow during the regeneration mode; and
a controller configured to operate the system in:
the absorption mode upon the submarine being submerged, and
the regeneration mode upon the submarine surfacing, such that at least one of the sorbent and the second airflow is heated by the heating means and the second airflow receives $CO_2$ from the adsorbent.

2. The system of claim 1, wherein the controller is additionally configured to determine a period of time the submarine can be submerged before the system is required to be placed into the regeneration mode.

3. The system of claim 1, wherein the controller is additionally configured to automatically select the mode of operation of the system.

4. The system of claim 2, wherein the controller is additionally configured to automatically select the regeneration mode at the end of the period of time.

5. The system of claim 1, further comprising at least one outside air inlet duct in airflow communication with the outside air inlet, wherein the controller automatically extends the duct from the submarine to access outside air upon the regeneration mode being operated, wherein the regeneration mode is operable upon the submarine being submerged.

6. The system of claim 4, further comprising at least one outside air inlet duct in airflow communication with the outside air inlet, wherein the controller automatically extends the duct from the submarine to access outside air at the end of the period of time.

7. The system of claim 1, wherein the heating means at least one of an engine of the submarine, a boiler of the submarine, a furnace of the submarine, a heat pump, and an electric coil.

8. The system of claim 1, wherein at least one of the outside air inlet and regeneration air outlet comprise at least one of an external hatch, a lid, and a damper.

9. The system of claim 8, wherein at least one of the external hatch, lid and damper are configured for water-tight sealing.

10. The system of claim 1, further comprising one or more cartridges, the cartridges being configured to contain the sorbent.

11. The system of claim 10, wherein the one or more cartridges are additionally configured for removal and/or replacement.

12. The system of claim 10, wherein the one or more cartridges comprise at least one of the following shapes: a rectangular sheet, a v-bank, and a hollow cylinder.

13. The system of claim 10, wherein the one or more cartridges comprise a plurality of cartridges and wherein each cartridge contains a different type of sorbent.

14. The system of claim 1, further comprising one or more dampers, shutters, fans, and/or valves, configured to seal off the assembly from the first airflow during the regeneration mode.

15. The system of claim 1, wherein the second airflow flows over and/or through the sorbent in a direction opposite to the flow of the first airflow over and/or through the sorbent.

16. The system of claim 1, further comprising at least one of one or more passive particle filters, electrostatic particle filters, catalysts, ultraviolet sources, plasma sources, and ion generators.

17. The system of claim 1, wherein the controller is further configured to control at least one of operation of the system, the one or more dampers, shutters, fans, valves, and/or heaters.

18. The system of claim 1, further comprising at least one sensor.

19. The system of claim 18, wherein the at least one sensor comprises a $CO_2$ sensor.

20. The system of claim 1, wherein the controller is additionally configured to determine an optimal temperature for regenerating the sorbent.

21. The system of claim 20, wherein determining the optimal temperature comprises determining at least one of: the type of sorbent, the time period for regenerating the sorbent, the lifespan of the sorbent, and the availability of heat or energy to raise the temperature of the sorbent to release adsorbed $CO_2$ and/or other contaminants.

* * * * *